Dec. 8, 1925.

1,564,803

H. E. WARREN

CLOCK

Filed Jan. 13, 1923

Inventor:
Henry E. Warren,
by *His Attorney.*

Patented Dec. 8, 1925.

1,564,803

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

CLOCK.

Application filed January 13, 1923. Serial No. 612,487.

*To all whom it may concern:*

Be it known that I, HENRY E. WARREN, a citizen of the United States, residing at Ashland, in the county of Middlesex, State of Massachusetts, have invented certain new and useful Improvements in Clocks, of which the following is a specification.

My invention relates to clocks and more in particular to clocks which are driven by electric motors receiving energy from a time-controlled electric distribution system.

In all such systems it is not entirely possible to eliminate failures of voltage or, on an alternating current system, errors in frequency such as would cause the secondary clock motors connected thereto to stop or vary in speed to such an extent as to produce a considerable error in the time indicated by a secondary clock. It is the purpose of my invention to supplement the electric motor which operates the clock by another motor for keeping the clock in normal operation should the electric distribution system fail for any reason. A further object of my invention is to arrange the two motors in such a manner that energy is stored by the electric motor, when conditions are normal, for operating the other motor when the distribution system fails. By failure of the distribution system as used in this specification and the appended claims, I mean any abnormal condition which causes the electric clock motor to stop or run below normal speed.

Figure 1:
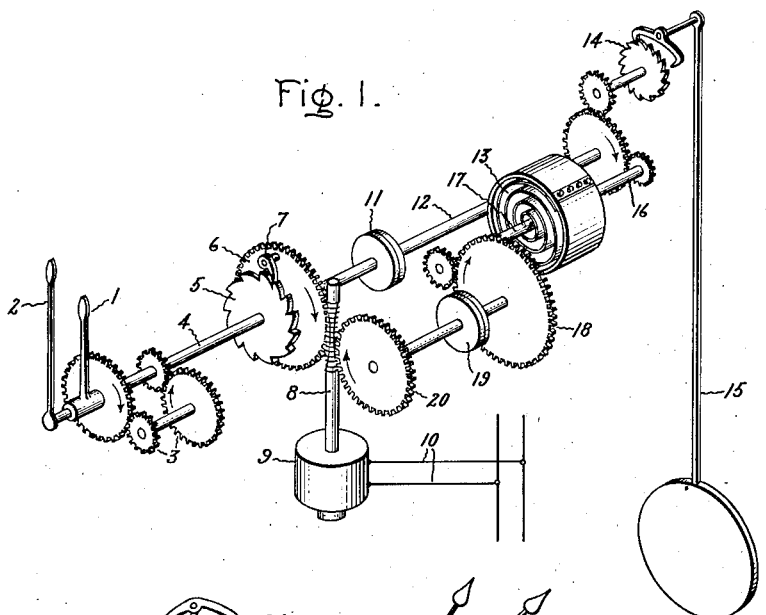
Figure 2:
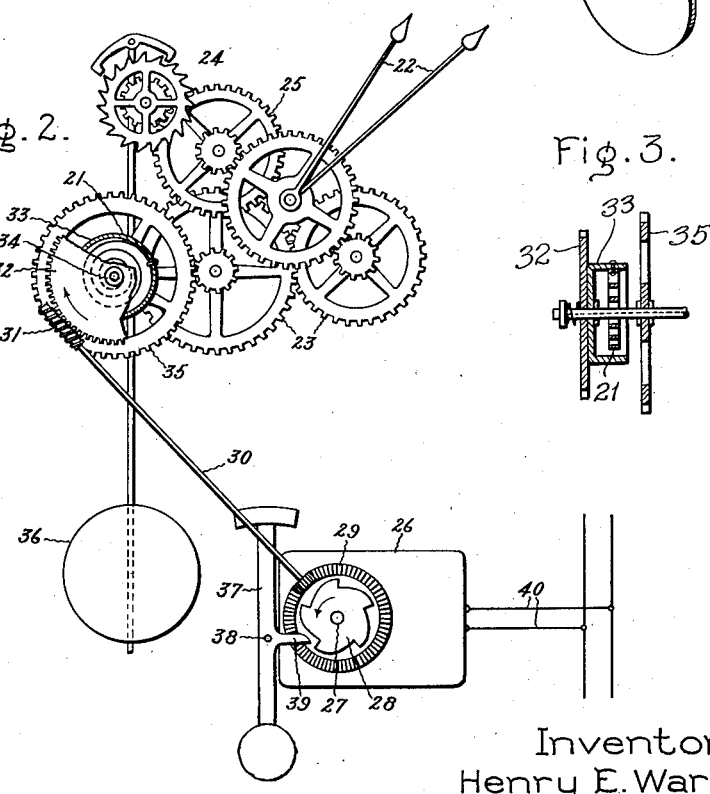
Figure 3:
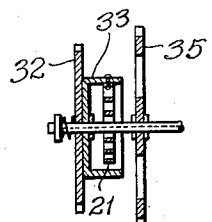

The features of my invention which I believe to be novel and patentable will be pointed out in the claims appended hereto. The construction and operation of my improved secondary clock will now be explained in connection with the accompanying drawings in which Fig. 1 represents what I now consider to be the preferred embodiment; Fig. 2 a modification thereof and Fig. 3 represents a cross section taken through the winding clutch of Fig. 2.

Referring to Fig. 1, 1 and 2 represent the hour and minute hands respectively of the clock driven at the proper relative speed by means of gearing 3 and shaft 4. Fastened to shaft 4 is a ratchet wheel 5 and rotatably mounted on shaft 4 is a worm gear wheel 6 provided with a pawl 7 which cooperates with ratchet wheel 5. Wheel 6, together with ratchet wheel 5 and the clock hands are normally driven through a worm shaft 8 by means of an electric motor 9. The motor 9 may be of any type suitable for driving the clock hands at the correct speed when the conditions of the transmission system, to which the motor is to be connected by lines 10, are normal. Where the distribution system to which the motor is connected is an alternating current system, I prefer to use a self-starting synchronous motor such as shown, for instance, in my United States Patent No. 1,283,432, assigned to the same assignee as the present invention, and for the purposes of this explanation the motor 9 may be considered to be such a motor.

It will now be evident that with the proper gear ratio between motor 9 and the clock hands and with a constant frequency alternating current supplied to the motor, the clock will operate in a well known manner to indicate time. As thus far described, it will be seen that if the distribution system supplying the clock fails, the motor 9 will stop or slow down and the clock will no longer indicate correctly. The means for eliminating this source of error will now be described.

Connected to shaft 4, preferably by means of a slip friction clutch 11, is a shaft 12 connected to be driven in a clockwise direction by an ordinary spring driven clock movement, here illustrated as of the pendulum type, comprising a spring 13, an escapement 14 and a pendulum 15, together with the necessary gearing. Obviously a weight driven clock might be used in place of a spring driven clock. This clockwork is arranged to drive shaft 12 at the same speed and in the same direction as motor 9 drives shaft 4 when the latter is operating at the correct speed to keep accurate time by means of the clock hands 1 and 2. It will now be seen that if, for any reason, motor 9 slows down or stops, the spring driven clock will operate the clock hands 1 and 2 through shaft 12, clutch 11 and shaft 4 until the spring 13 runs down or until the motor 9 again operates at normal speed.

In order that the spring driven clock will normally be in condition for this emergency, I provide means for normally maintaining spring 13 wound up. One end of the spring is connected to shaft 16, leading to the clock movement and the other end of the spring is connected to a spring winding shaft 17. Shaft 17 is connected through suitable gears 18, slip friction clutch 19 and worm gear 20 to the worm shaft 8 of motor 9. The gear ratio between motor 9 and spring 13 is such that, with the motor 9 and the spring driven clock operating at normal speed, spring 13 is slowly wound up. When the spring becomes fully wound, clutch 19 will slip sufficiently to keep all the parts in normal operation and the spring fully wound. Should the motor 9 stop, the irreversible worm gear drive between 8 and 20 prevents the spring 13 from driving the motor backward. The spring driven clock movement may comprise an inexpensive 24 hour clock movement such as is used in an ordinary alarm clock or the capacity of the spring may be such to keep the clock in operation for longer or shorter periods without being wound. Obviously a separate electric motor might be used for winding up spring 13.

By means of this arrangement, no error in the clock indication is caused due to a failure of the distribution system unless said failure persists for a sufficient length of time to cause clock spring 13 to be completely unwound. Momentary failures of voltage are more or less common, but it is very rare for such failures to persist for 24 hours or longer, although it will be evident that the clock spring 13 might be made of sufficient capacity to keep the clock in operation for a week, if necessary. No attention need be given to the apparatus for rewinding because this is taken care of by motor 9. The rewinding of spring 13 is very gradual so that the capacity of motor 9 need not be increased on account of this extra load. Slip friction clutch 11 is not absolutely necessary; however, it is desirable, as it permits the clock-hands to be set by hand and also prevents damage to the spring driven clock movement should the speed of motor 9 increase above its normal value.

It will be evident that with this arrangement an exact regulation of frequency on the distribution system is unnecessary so long as the frequency is not allowed to rise above its normal value. Consequently, the clock will keep very good time if used on an ordinary alternating current distribution system where the frequency is normally allowed to vary several percent. It will also be evident that I might use an induction motor instead of a synchronous motor at 9 adjusted to drive the clock at normal speed with a normal slip when the frequency is normal. Then, should the frequency increase slightly, the motor speed will be held down to normal by means of escapement 14, because as soon as the induction motor attempts to drive shaft 12 above normal speed, an additional load is imposed thereon due to the escapement and the slip of the motor increases. If the frequency drops below normal the spring clock movement keeps the clock in operation at normal speed. Thus, with an induction motor at 9, or with any other type of motor which has a tendency to decrease its speed with load, the escapement 14 acts as such for both the motor 9 and the spring 13. If desirable, means for automatically suspending the operation of the spring driven clock movement during the normal operation of motor 9 may be provided.

Referring to Fig. 2, an ordinary pendulum clock movement comprising a driving spring 21 connected to clock hands 22 through gears 23 and controlled by a pendulum escapement 24 operating through gears 25, has its spring wound up by means of a motor 26, preferably of the self-starting synchronous type. Motor 26 drives through suitable reduction gears, not shown, a shaft 27 on which is mounted the cam wheel 28 and a gear wheel 29. Geared to wheel 29 is a shaft 30 and geared to shaft 30 by means of worm gear 31, is a gear 32 for winding up spring 21 through a slip friction clutch comprising the inner wall of gear wheel 32 and the outer wall of a drum 33 enclosing spring 21 (see Fig. 3). The two parts of the clutch are loose on shaft 34 to which gear 35 is fastened and one end of the spring 21 is fastened to shaft 34. Other equivalent arrangements may be substituted. With the arrangement described, as soon as the spring is fully wound, the clutch will slip and should the motor 26 stop, the irreversible gear drive will prevent any tendency for the spring to drive the motor in the reverse direction.

Mounted adjacent the pendulum 36 is a pendulum hammer 37. This hammer is pivoted at 38 and is provided with an arm 39 which stands in the path of the cams on wheel 28. The normal period of vibration of hammer 37 and pendulum 36 is the same and corresponds to the period necessary to keep the clock in operation at correct speed. The number of cams on wheel 28 is such that, when motor 26 is operated by a normal frequency current supplied there ) over a distribution system by means of leads 40, the hammer 37 will be oscillated by said cams at its natural frequency and in so doing, will strike pendulum bob 36 at the correct part of its swing to impart an impulse thereto sufficient to keep the pendulum in normal oscillation. The clockwork is therefore driven by spring 21 in accordance with the speed determined by the oscillations of pendulum hammer 37. The shape of the escapement mechanism 24 is preferably such that the clock will be driven through the escapement from the motor should the spring be unwound. Small variations in frequency of the distribution system will not affect the normal operation, as oscillations of hammer 37 which do not materially differ from normal will force pendulum 37 to oscillate at a corresponding frequency.

In case the alternating current distribution system fails, motor 40 will stop and hammer 37 will stand in the position illustrated out of reach of the normal swing of pendulum 36. However, the clock will continue to operate at normal speed, receiving its energy from spring 21. When the voltage again comes back on the motor 40, it will start up and after a few oscillations, pendulum 36 and hammer 37 will get into step. Spring 21 will be slowly wound up as explained in connection with the apparatus in Fig. 1.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. In combination, a time indicator, a pair of motors connected to directly operate said indicator, one of said motors being electrical, and means whereby said electric motor is caused to store potential energy for operating said other motor.

2. In combination, a time indicator, an electric motor for operating said indicator, and a clock movement also operatively connected to said indicator, said clock movement connection being constructed and arranged to supplement the action of said electric motor whenever said electric motor operates at a speed which would operate said time indicator incorrectly.

3. In combination, an electric distribution system, a time indicator, an electric motor supplied from said system connected to operate said indicator when said distribution system is normally energized, a potential energy driven clock movement connected to operate said indicator when said distribution system fails, and automatic means for winding up said clock movement.

4. In combination, an electric distribution system, an electric clock driven therefrom, a potential energy driven clock movement associated with said electric clock in such a way as to drive the hands of the electric clock upon a failure of the distribution system, and automatic means for winding up said last mentioned clock movement, receiving its energy from said distribution system.

5. In combination, a time indicator, a potential energy driven clock movement for driving said indicator, an electric clock movement including an electric motor for driving said indicator, and connections for causing said electric motor to wind up said first mentioned clock movement.

6. In combination, a time indicator, a potential energy driven clock movement for driving said indicator, an electric clock movement including an electric motor for driving said indicator, means for causing said motor to wind up said first mentioned clock movement, and means for permitting said motor to drive said indicator when said first mentioned clock movement is fully wound.

7. In combination, a time indicator, a a spring driven clock movement connected to operate said indicator, an electric motor connected to operate said indicator, a connection for causing said electric motor to wind up said spring driven clock movement, said connections being so arranged that the operation of the indicator by the spring driven clock movement is permitted and a backward rotation of said motor is prevented when said motor is deenergized.

8. An electric distribution system, a time indicator, and electric motor connected to said system arranged to operate said time indicator when the conditions on said distribution system are normal, a spring driven clock movement connected to operate said indicator when said distribution system fails, and a driving connection, including an irreversible gear and a slip friction clutch between said motor and spring for slowly winding up said spring when said motor is in normal operation.

9. In combination, a time indicator, a spring driven clock connected to operate said indicator, an electric motor connected to operate said indicator, said connection being such that should the speed of said motor fall below normal, said spring driven clock movement will operate said indicator, and means for preventing injury to said spring driven clock movement in case said motor speed should rise above normal.

10. In combination, a time indicator, a spring driven clock movement connected to operate said indicator, an electric motor connected to operate said indicator when the motor speed is normal, said connection being such that should the speed of said motor fall below normal, said spring driven clock movement will operate said indicator, and means for imposing an additional load on said electric motor should it attempt to run above normal speed.

11. In combination, an alternating current distribution system, an electric clock driven therefrom, a spring driven clock movement connected to drive the hands of said electric clock should said distribution system fail, the connection of the motor to the hands of the electric clock being such as to allow the electric motor to stop or run below normal speed without interfering with the operation of said spring driven clock movement and a driving connection, including an irreversible gear drive and a slip friction clutch between said electric motor and the winding stem of said spring driven clock movement.

In witness whereof, I have hereunto set my hand this 2nd day of January, 1922.

HENRY E. WARREN.